(12) United States Patent
Kim et al.

(10) Patent No.: US 8,720,294 B2
(45) Date of Patent: May 13, 2014

(54) SHIFTING APPARATUS FOR VEHICLE

(75) Inventors: Eunsik Kim, Daegu (KR); Jongho Hong, Seoul (KR); Jeehyuck Choi, Hwaseong-si (KR); Jeongseon Min, Hwaseong-si (KR); Yangrae Cho, Hwaseong-si (KR); Chunnyung Heo, Gyeongsan-si (KR); Kwanggi Lee, Daegu (KR); Dongjae Kim, Gyeongsan-si (KR)

(73) Assignees: Hyundai Motor Company, Seoul (KR); SL Corporation, Dae-Gu (KR)

( * ) Notice: Subject to any disclaimer, the term of this patent is extended or adjusted under 35 U.S.C. 154(b) by 160 days.

(21) Appl. No.: 13/247,524

(22) Filed: Sep. 28, 2011

(65) Prior Publication Data

US 2012/0144949 A1 Jun. 14, 2012

(30) Foreign Application Priority Data

Dec. 9, 2010 (KR) .......................... 10-2010-0125411

(51) Int. Cl.
*B60K 20/00* (2006.01)
*F16H 59/04* (2006.01)

(52) U.S. Cl.
USPC ...................................... 74/473.33; 74/473.3

(58) Field of Classification Search
USPC .............. 74/473.1, 473.18, 473.19, 74/473.21–473.26, 473.29, 473.3, 473.33, 74/900; 477/99, 111, 165; 180/270, 287; 307/10.4
See application file for complete search history.

(56) References Cited

U.S. PATENT DOCUMENTS 3,643,528 A * 2/1972 van der Loos ................ 477/113
3,793,901 A * 2/1974 Muller et al. ................ 74/473.3
(Continued)

FOREIGN PATENT DOCUMENTS

JP 05-286375 A 11/1993
JP 2001-334846 A 12/2001
(Continued)

*Primary Examiner* — Troy Chambers
*Assistant Examiner* — Jake Cook
(74) *Attorney, Agent, or Firm* — Morgan, Lewis & Bockius LLP (57) ABSTRACT

A shifting apparatus capable of selecting any one of plural shift ranges according to a driver's manipulation intention and allowing the driver to additionally express his/her consecutive manipulation intention in a specific shift range may include: a main shaft, a shifting lever installed to slide in a straight line and pivot along the main shaft, and a gate plate limiting a reciprocation path of the shifting lever such that the shifting lever reciprocates on a single path while sliding in a straight line and pivoting along the main shaft. The gate plate may include a gate pattern having a plurality of shift ranges arranged in a line on the reciprocation path and formed in such a manner that a specific shift range among the plurality of shift ranges is discriminated from the other shift ranges.

16 Claims, 11 Drawing Sheets

(56) References Cited

U.S. PATENT DOCUMENTS

| | | | |
|---|---|---|---|
| 4,189,952 A * | 2/1980 | Zajichek | 74/473.24 |
| 6,272,944 B1 * | 8/2001 | Jeong | 74/473.33 |
| 6,311,577 B1 * | 11/2001 | Worner et al. | 74/473.21 |
| 6,360,624 B1 | 3/2002 | Sedlmaier et al. | |
| 6,712,736 B2 * | 3/2004 | Scarlata | 477/99 |
| 6,848,560 B2 * | 2/2005 | Inoue | 192/220.5 |
| 7,552,659 B2 * | 6/2009 | Komatsu et al. | 74/335 |
| 7,817,018 B2 * | 10/2010 | Chen | 340/426.1 |
| 2002/0026846 A1 | 3/2002 | Lee | |
| 2002/0130020 A1 * | 9/2002 | Rankin | 200/61.88 |
| 2004/0206610 A1 * | 10/2004 | Hasegawa et al. | 200/10 |
| 2005/0126326 A1 * | 6/2005 | Onodera | 74/473.18 |
| 2009/0000413 A1 * | 1/2009 | Furhoff et al. | 74/473.3 |
| 2010/0307276 A1 * | 12/2010 | Giefer et al. | 74/473.3 |
| 2011/0132122 A1 * | 6/2011 | Park et al. | 74/473.12 |
| 2011/0277578 A1 * | 11/2011 | McGuire et al. | 74/473.3 |

FOREIGN PATENT DOCUMENTS

| | | |
|---|---|---|
| JP | 2005-119330 A | 5/2005 |
| JP | 2006-159948 A | 6/2006 |
| JP | 2007-45390 A | 2/2007 |
| JP | 2007-161188 A | 6/2007 |
| JP | 2008-56019 A | 3/2008 |
| JP | 2008-239056 A | 10/2008 |
| JP | 2010-105620 A | 5/2010 |
| KR | Sil 1998-034487 U | 9/1998 |
| KR | 10-0726546 B1 | 6/2007 |
| KR | 10-2009-0122450 A | 11/2009 |

* cited by examiner

SHIFTING APPARATUS FOR VEHICLE

CROSS-REFERENCE TO RELATED APPLICATIONS

The present application claims priority of Korean Patent Application Number 10-2010-0125411 filed Dec. 9, 2010, the entire contents of which application are incorporated herein for all purposes by this reference.

BACKGROUND OF INVENTION

1. Field of Invention

The present invention relates to a shifting apparatus for a vehicle, and more particularly, to a technique which is capable of selecting any one of plural shift ranges, forming a displacement according to consecutive operations of a driver within the same shift range, and detecting the displacement according to the consecutive operations and may be utilized for controlling various devices as well as a shifting apparatus for a vehicle.

2. Description of Related Art

A conventional shifting apparatus for a vehicle includes a shifting lever to receive a driver's shifting intention, and is constructed to select a desired specific shift range when the driver manipulates the shifting lever according to gate patterns including P, R, N, D, and so on. When the driver selects any one of the shift ranges by the shifting lever, the conventional shifting apparatus controls a transmission to operate a vehicle according to the selection.

Recently, a gate pattern for a manual mode has been added. Thus, when the driver manipulates the shifting lever to M+ or M−, the transmission may increase or decrease a gear ratio stepwise to perform shifting.

According to the above-described conventional gate patterns, the shifting lever can select a specific shift range, but cannot consecutively receive the driver's manipulation intention within the selected specific shift range.

That is, when the shifting lever selects a shift range among P, R, N, and D ranges, other manipulations cannot be performed except the manipulation for selecting any one shift range. Even in the manual mode, the driver can only express his/her manipulation intention by repetitively selecting the shifting lever to M+ and M−, and the conventional shifting apparatus cannot receive the driver's consecutive manipulation intention.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide a shifting apparatus for a vehicle, which is capable of selecting any one of plural shift ranges according to a driver's manipulation intention, allowing the driver to additionally express his/her consecutive manipulation intention in a specific shift range, detecting the consecutive manipulation intention, and reflecting the driver's consecutive manipulation intention to other devices as well as a transmission mounted on the vehicle, whereby the vehicle is controlled according to the driver's manipulation intention.

Various aspects of the present invention are directed to provide a shifting apparatus for a vehicle, including a main shaft; a shifting lever installed to slide in a straight line and pivot along the main shaft; and a gate plate limiting a reciprocation path of the shifting lever such that the shifting lever reciprocates on the single path while sliding in a straight line and pivoting along the main shaft, the gate plate including a gate pattern having a plurality of shift ranges arranged in a line on the reciprocation path, wherein the gate pattern of the gate plate is formed in such a manner that one specific shift range among the plurality of shift ranges is discriminated from the other shift ranges, and the specific shift range is set in such a manner that the shifting lever forms consecutive displacements with respect to the gate plate.

Other aspects of the present invention are directed to provide a shifting apparatus for a vehicle, including a shifting lever; a gate plate sequentially selecting a plurality of shift ranges according to the movement of the shifting lever along a single path that is not branched, the gate plate including a gate pattern that is set to form a consecutive displacement of the shifting lever with respect to one specific shift range among the plurality of shift ranges; a guide unit guiding the shifting lever to move along the gate pattern of the gate plate; and a detection unit detecting the movement of the shifting lever along the gate pattern.

According to various aspects of the present invention, it is capable of selecting any one of plural shift ranges according to a driver's manipulation intention, allowing the driver to additionally express his/her consecutive manipulation intention in a specific shift range, detecting the consecutive manipulation intention, and reflecting the driver's consecutive manipulation intention to other devices as well as a transmission mounted on the vehicle, whereby the vehicle is controlled according to the driver's manipulation intention.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
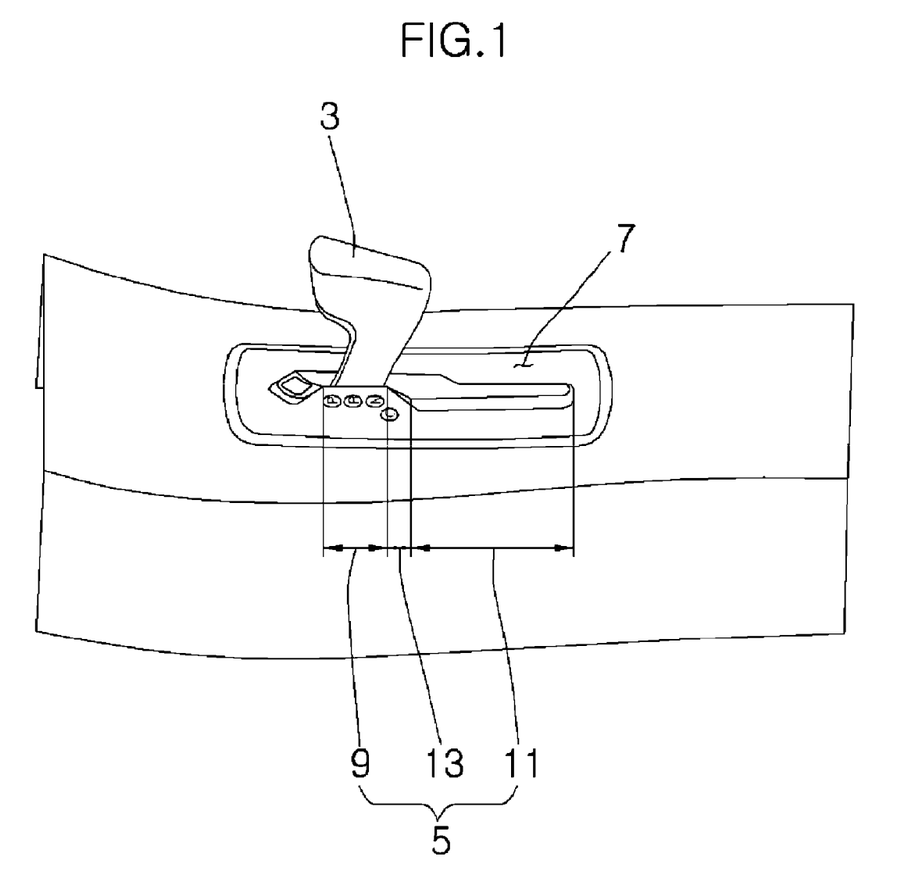
FIG. 1 shows an external appearance of an exemplary shifting apparatus according to the present invention installed in a vehicle.
Figure 2:
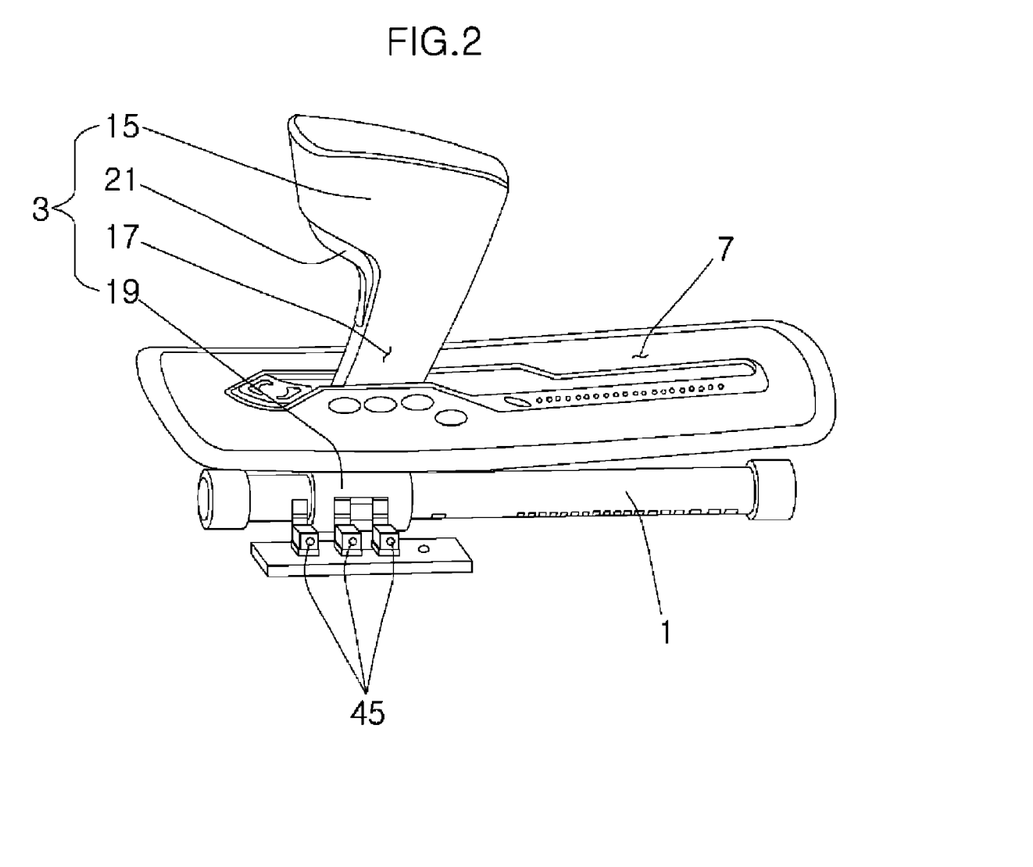
FIG. 2 is a view showing an exemplary shifting apparatus according to the present invention.

Referring to FIGS. 1 to 2, exemplary shifting apparatuses according to the present invention may include a main shaft 1, a shifting lever 3, and a gate plate 7. Shifting lever 3 is installed to slide in a straight line and pivot along main shaft 1. Gate plate 7 limits a reciprocation path of shifting lever 3 such that shifting lever 3 reciprocates on the single path while sliding in a straight line and pivoting along main shaft 1. Gate plate 7 includes a gate pattern 5 having a plurality of shift ranges arranged in a line on the reciprocation path.

Gate pattern 5 of gate plate 7 is formed in such a manner that one specific shift range among the plurality of shift ranges may be discriminated from the other shift ranges. The specific shift range is set in such a manner that shifting lever 3 forms consecutive displacements with respect to gate plate 7.

Gate pattern 5 of gate plate 7 includes a first section 9 in which the other shift ranges except the specific shift range among the plurality of shift ranges are sequentially disposed at a predetermined distance from each other, a second section 11 which is disposed to deviate from first section 9 and forms the specific shift range, and a connection section 13 which is inclined to connect first and second sections 9 and 11.

Figure 7:
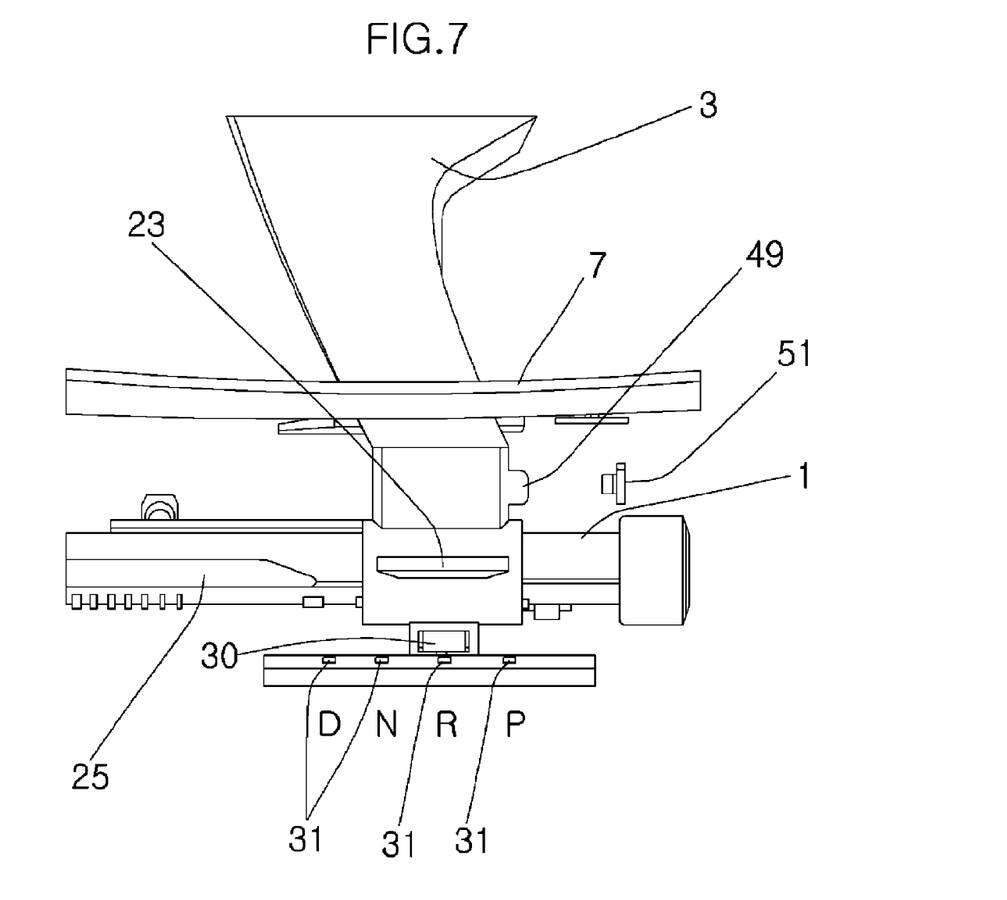
FIGS. 7 to 10 are partial detailed views of an exemplary shifting apparatus according to the present invention.

Referring to FIG. 7, second section 11 includes a D range for the running of a vehicle, and first section 9 includes the other shift ranges excluding the D range.

That is, P, R, and N ranges are arranged in first section 9, and the D range is arranged in entire second section 11. Therefore, when shifting lever 3 is moved within first section 9, any one of the P, R, and N ranges may be selectively selected. Furthermore, when shifting lever 3 is moved to second section 11, a driver's manipulation intention may be transferred according to an additional displacement of shifting lever 3 in a state in which the D range is selected.

The selection of each shift range or the driver's manipulation intention provided by the additional displacement of shifting lever 3 within the D range may be received by a separate controller or the like and be properly processed.

Referring to FIG. 2, shifting lever 3 includes a knob portion 15, a lever portion 17, a slide portion 19, and a safety button 21. Knob portion 15 is grasped and manipulated by a driver's hand. Lever portion 17 extends to a lower side of knob portion 15 and passes through gate plate 7. Slide portion 19 is provided under lever portion 17 and covers main shaft 1 so as to slide in a straight line and pivot along main shaft 1. Safety button 21 is provided to receive a driver's switching manipulation.

Thus, when the driver grasps knob portion 15 of shifting lever 3 and applies a manipulation force to move shifting lever 3 back and forth along the longitudinal direction of main shaft 1, slide portion 19 is moved along main shaft 1 to select each shift range.

Figure 5:
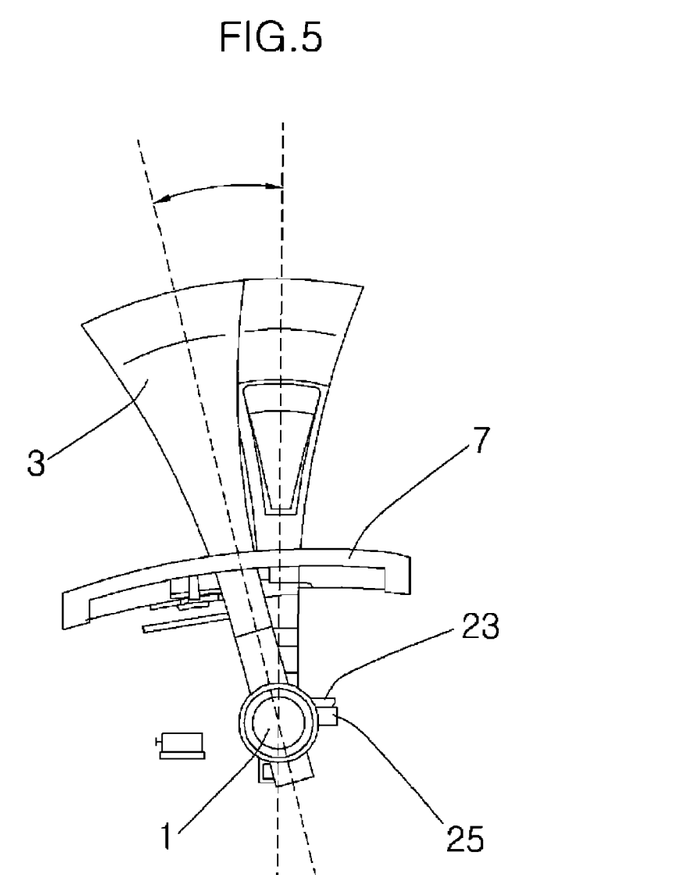
FIG. 5 is a left-side view of an exemplary shifting apparatus according to the present invention.

Referring to FIGS. 1 and 5, shifting lever 3 further includes a guide wing 23 and a pivot guide 25. Guide wing 23 protrudes from a side surface of slide portion 19 of shifting lever 3, in order to pivot shifting lever 3 along connection section 13 when shifting lever 3 is moved from first section 9 to second section 11 through connection section 13. Pivot guide 25 is installed to come in contact with guide wing 23, when guide wing 23 is moved in a straight line along main shaft 1, and pivot slide portion 19 on main shaft 1.

Figure 6:
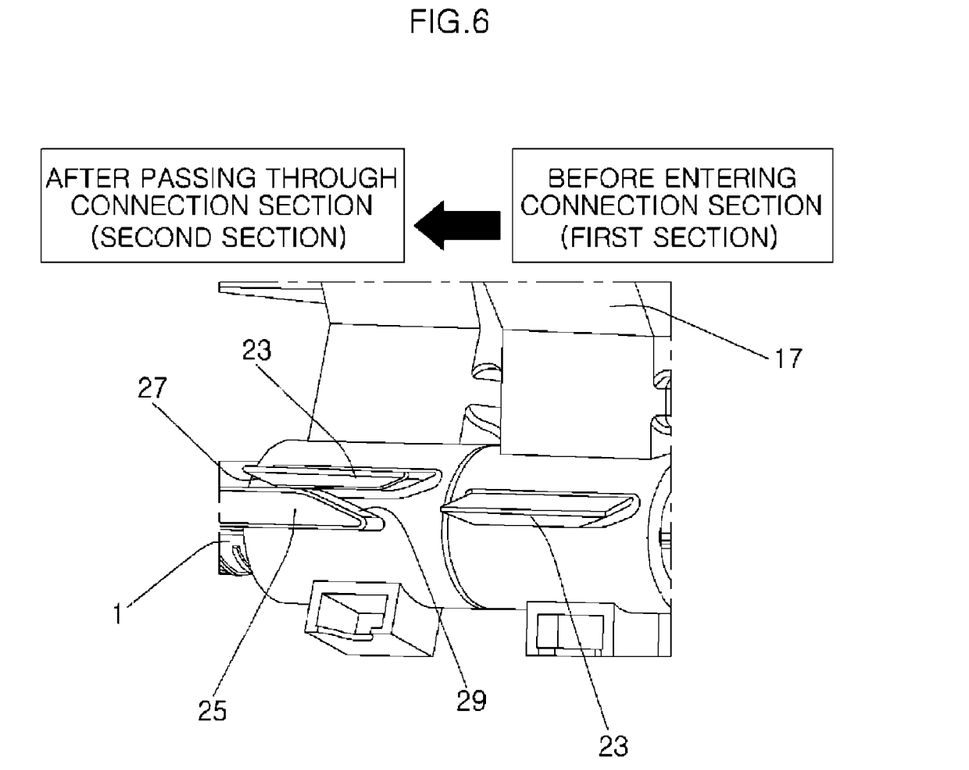
FIG. 6 shows a structure that guides to pivot the shifting lever at the connection section.

Referring to FIG. 6, guide wing 23 and pivot guide 25 include inclined surfaces 27 and 29, respectively, which are opposite to each other and come in surface contact with each other. While inclined surface 27 of guide wing 23 is moved along inclined surface 29 of pivot guide 25, shifting lever 3 is moved along connection section 13.

That is, when shifting lever 3 enters connection section 13 from first section 9, inclined surfaces 27 and 29 of guide wing 23 and pivot guide 25 begin to come in contact with each other. When shifting lever 3 is further moved toward second section 11, inclined surface 27 of guide wing 23 is moved along inclined surface 29 of pivot guide 25 to thereby pivot slide portion 19 with respect to main shaft 1 as illustrated in FIG. 5. Furthermore, when inclined surface 27 of guide wing 23 is separated from inclined surface 29 of pivot guide 25, shifting lever 3 enters second section 11. Then, only straight displacements of shifting lever 3 are formed.

Referring to FIG. 7, slide portion 19 includes a sensing element 30 and a plurality of position sensors 31. The plurality of position sensors 31 may detect whether or not each of the shift ranges arranged in first section 9 is selected while shifting lever 3 is moved along first section 9, according to the position of sensing element 30.

In various exemplary embodiments, sensing element 30 may include a magnet, and the plurality of position sensors 31 may include a plurality of magnet approach sensors which are disposed in the respective shift ranges to sense the approach of the magnet.

Magnet approach sensor may include a conventional hole sensor or the like. Furthermore, any kind of sensor which is capable of confirming an approach state of the magnet even in a non-contact state when the magnet approaches the sensor may be used as the magnet approach sensor.

Figure 8:
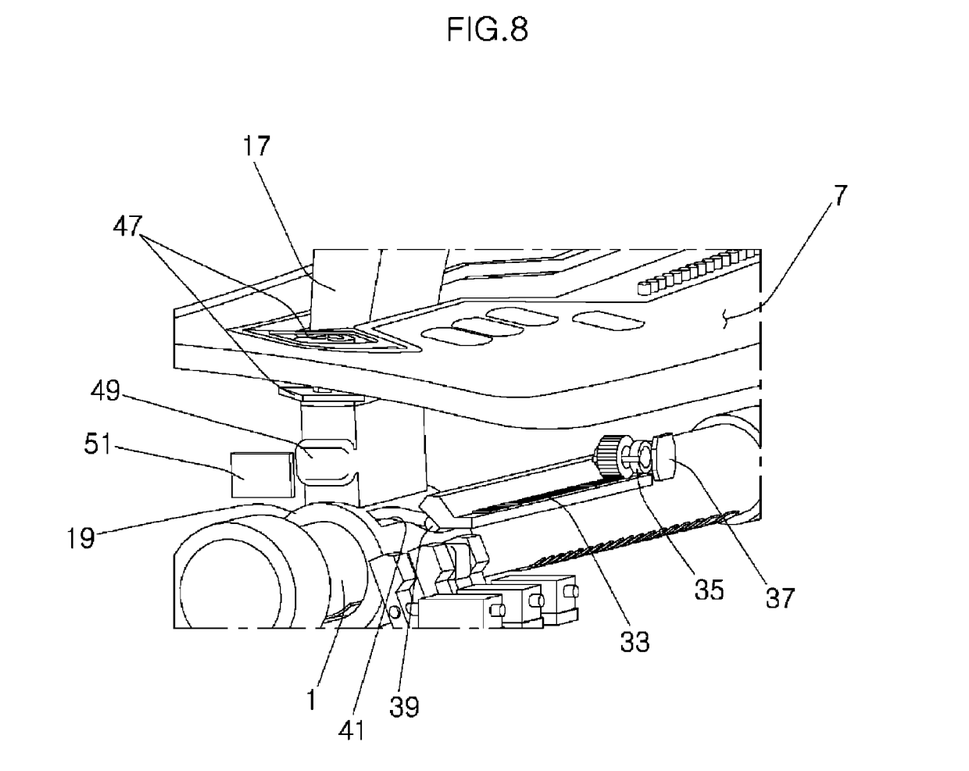

Referring to FIG. 8, the shifting apparatus further includes a consecutive detection unit which consecutively detects displacements of slide portion 19, when shifting lever 3 is moved in second section 11.

In various exemplary embodiments, the consecutive detection unit includes a rack bar 33, a rotating magnet 35, and a magnet rotation sensor 37. Rack bar 33 is provided to move straight along main shaft 1 together with slide portion 19, when shifting lever 3 enters second section 11. Rotating magnet 35 is geared with rack bar 33 and provided to rotate along the straight movement of rack bar 33. Magnet rotation sensor 37 serves to sense the rotation of rotating magnet 35.

It is apparent that magnet rotation sensor 37 may include a variety of magnet sensors such as a conventional hole sensor, which are capable of sensing a rotation angle at which rotating magnet 35 is rotated.

Rack bar 33 is integrally formed with an operation protrusion 39 protruding toward slide portion 19, and operation protrusion 39 is inserted into slide portion 19. One will appreciate that the rack bar and operation protrusion may be monolithically formed. A rack bar operation groove 41 is integrally formed so that when shifting lever 3 is moving in first section 19, it does not interfere with operation protrusion 39 and, only when shifting lever 3 is moving in second section 11, operation protrusion 39 and slide portion 19 are integrated together.

Therefore, while shifting lever 3 is moving in first section 9, rack bar 33 is not moved. When shifting lever 3 is moved to second section 11, operation protrusion 39 is restricted by rack bar operation groove 41. Thus, rack bar 33 is moved straight along the longitudinal direction of main shaft 1 together with slide portion 19. Such a straight movement of rack bar 33 rotates rotating magnet 35 and therefore the displacement of rack bar 33, that is, the additional displacement within the D range of shifting lever 3, can be consecutively detected through magnet rotation sensor 37.

As described above, the information on the displacement of shifting lever 3, which is detected in magnet rotation sensor 37, and the information on the position of shifting lever 3, which is detected by the plurality of position sensors 31, are provided to a separate controller or the like to reflect a driver's manipulation intention. Therefore, the information may be utilized to control a transmission according to the driver's manipulation intention and consecutively control other devices mounted on the vehicle.

Figure 9:
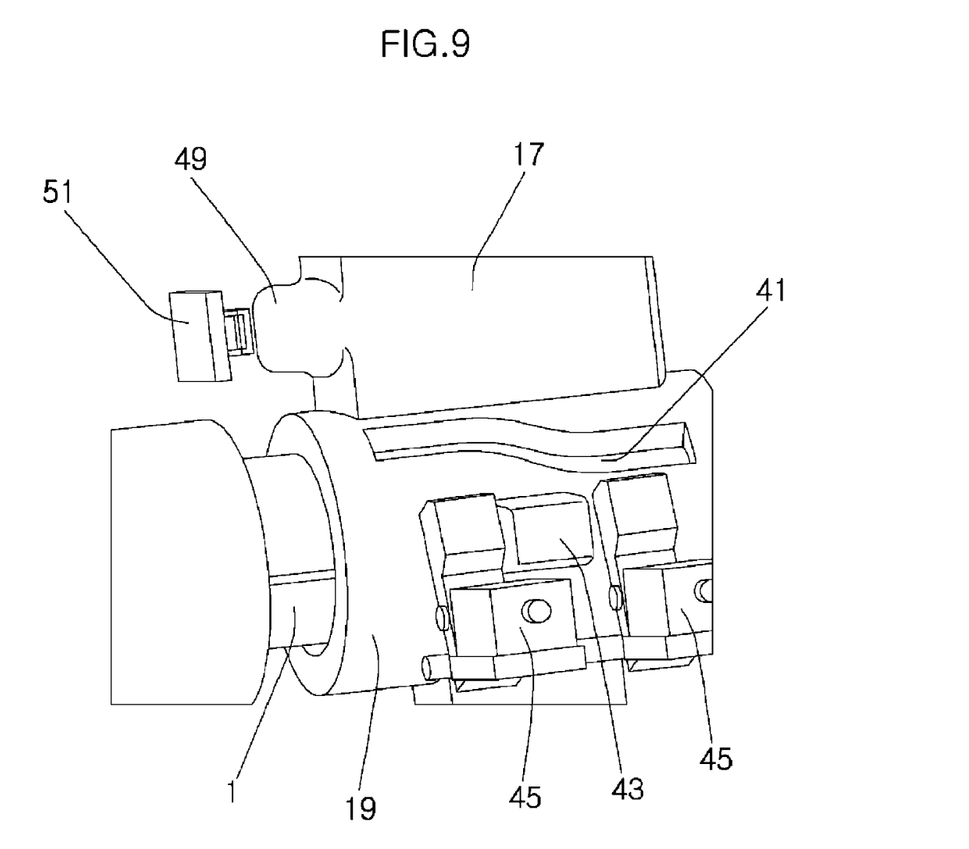
Figure 10:
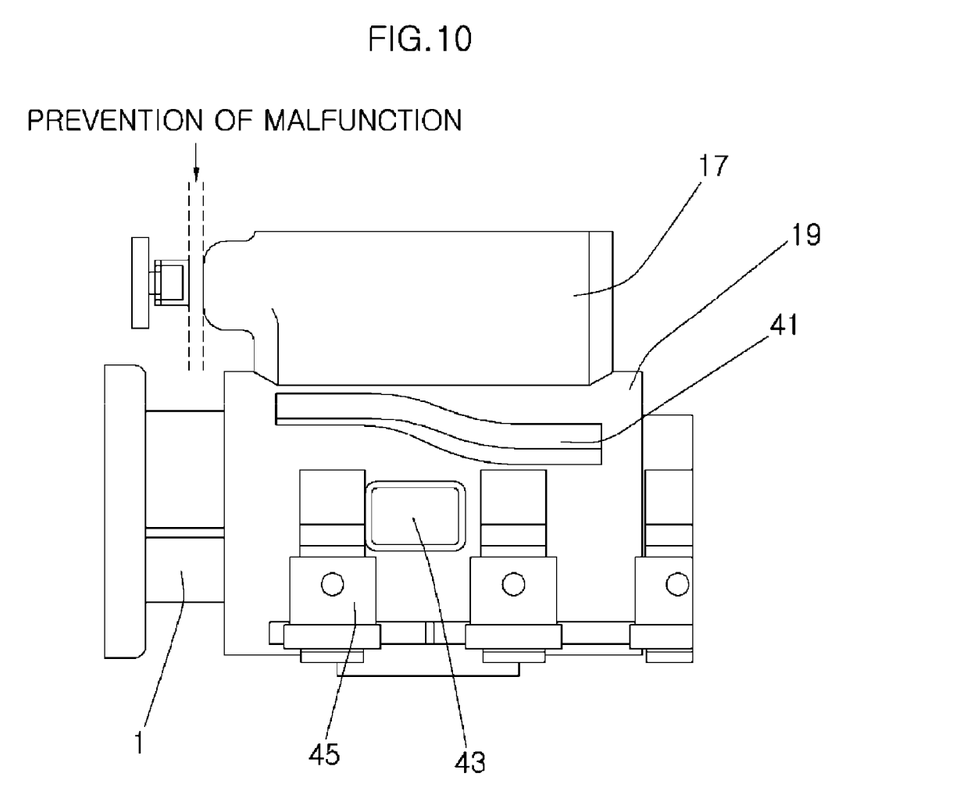
Figure 11:
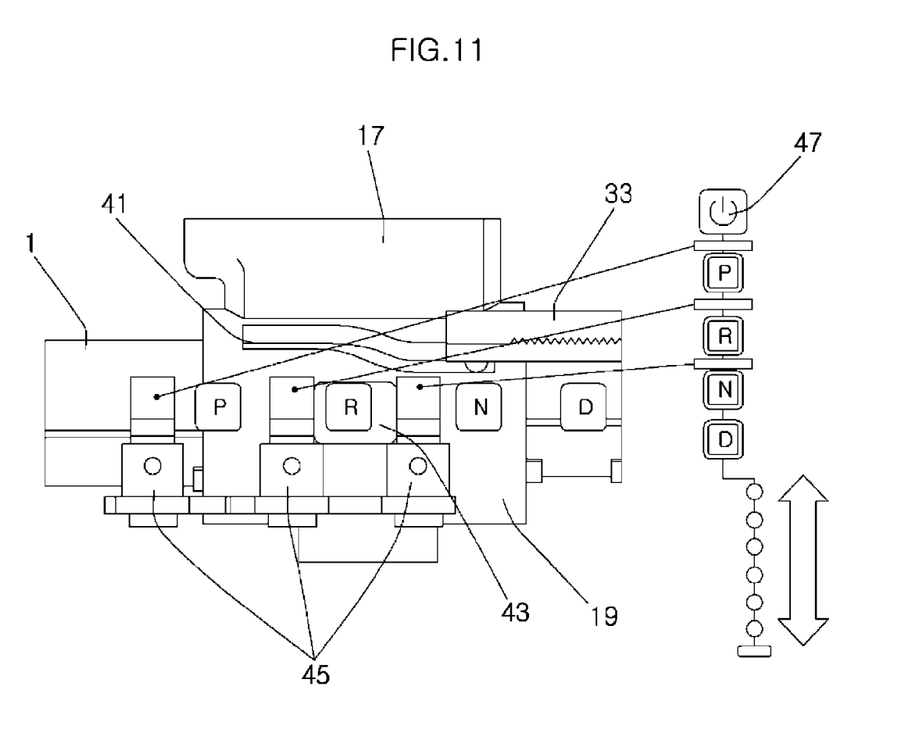
FIG. 11 shows a shift lock function and gate patterns of an exemplary shifting apparatus according to the present invention.

Referring to FIGS. 9 to 11, exemplary shifting apparatuses according to the present invention may include a shift lock protrusion 43 and a plurality of shift lock actuators 45. Shift lock protrusion 43 is formed to integrally protrude from a side of slide portion 19 in order to implement the shift lock function. One will appreciate that the shift lock protrusion may be monolithically formed on the slide portion. The plurality of shift lock actuators 45 are provided to block both sides of shift lock protrusion 43, when shifting lever 3 is positioned in each shift range arranged in first section 9, and switch a state limiting the movement of shift lock protrusion 43 along the longitudinal direction of main shaft 1.

As described above, since shift lock actuators 45 are controlled by the separate controller, shift lock protrusion 43 is limited by shift lock actuators 45 when shifting lever 3 is positioned in the P range or the R range, or when shifting lever 3 intends to be moved from the N range to the R range. Hence, shifting lever 3 cannot be arbitrarily moved. When a preset condition is satisfied as in a case in which a driver manipulates safety button 21, the controller controls shift lock actuator 45 to release the limitation of shift lock protrusion 43, so that the driver can move shifting lever 3 to a desired position.

It is apparent that the shift lock function by shift lock actuators 45 and shift lock protrusion 43 can be implemented to operate differently from the above-described embodiment with respect to each of the shift ranges.

The P range forming a parking state is arranged at one of both ends of first section 9, which is opposite to an end to which connection section 13 is connected, and an ignition switch capable of controlling the ignition of a vehicle engine is provided outside the P range of first section 9.

In various exemplary embodiments, the ignition switch includes a first ignition switch 47, an ignition protrusion 49, a second ignition switch 51, and the shift lock actuators 45. First ignition switch 47 is manipulated by a pressure that a user applies downward from an upper side of gate plate 7. Ignition protrusion 49 protrudes from lever portion 17 of shifting lever 3 forwardly in the longitudinal direction of main shaft 1. Second ignition switch 51 is manipulated by ignition protrusion 49 when shifting lever 3 is pushed forwardly in the longitudinal direction of main shaft 1. Shift lock actuators 45 limit the movement of shift lock protrusion 43 when shifting lever 3 is in the P range, and allow the movement of shift lock protrusion 43 when safety button 21 is manipulated, whereby ignition protrusion 49 can pressurize second ignition switch 51.

That is, a driver can ignite the vehicle by manipulating first ignition switch 47 with his/her own hand, or can ignite the vehicle through second ignition switch 51 by pushing shifting lever 3 forwardly in the longitudinal direction of main shaft 1, that is, in the left direction in FIG. 2, in a state in which the driver presses safety button 21.

For reference, FIG. 10 is a view explaining the prevention of the malfunction of second ignition switch 51 which is caused by the false manipulation of shifting lever 3 by shift lock actuators 45.

Referring back to FIG. 3, a first detent magnet 53 is provided at the inside of slide portion 19 in order to give a restrained manipulation feeling when shifting lever 3 selects each shift range of first section 9, and a plurality of second detent magnets 55 are provided in main shaft 1 to interact with first detent magnet 53 to form a restrained manipulation feeling.

Figure 3:
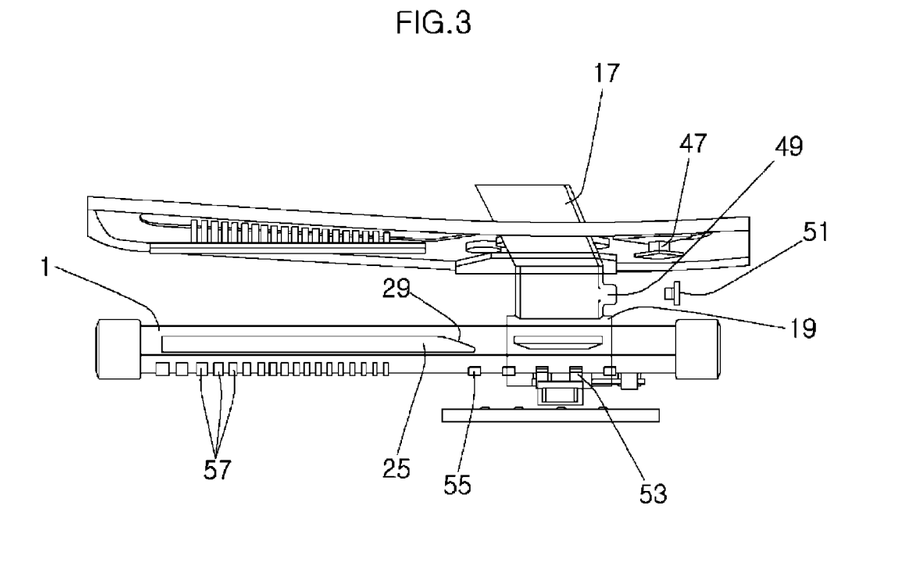
FIG. 3 is a partial detailed view of an exemplary shifting apparatus according to the present invention.
Figure 4:
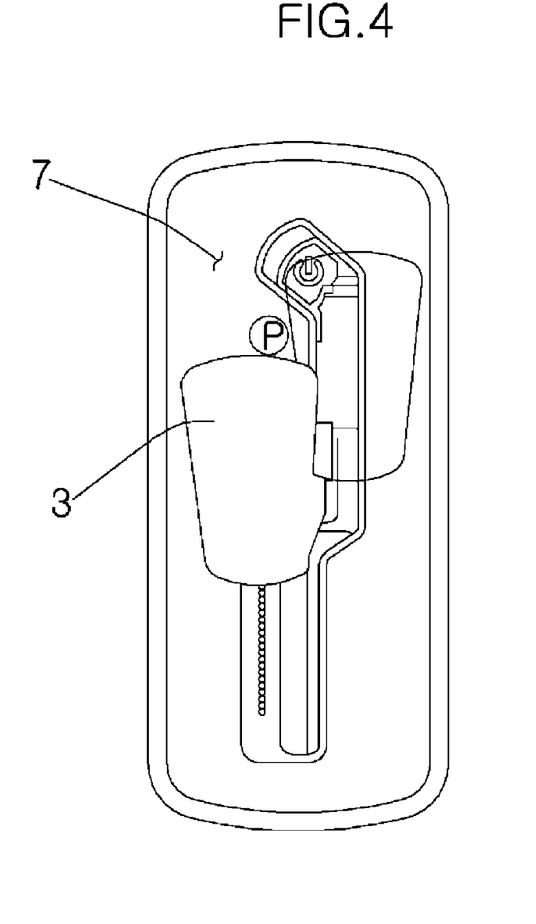
FIG. 4 is a top view of an exemplary shifting apparatus according to the present invention.

Therefore, when a driver moves shifting lever 3 in first section 9 in the longitudinal direction of main shaft 1, shifting lever 3 is positioned restrainedly at positions at which the shifting ranges are arranged by a magnetic force acting between first detent magnet 53 and second detent magnets 55, thereby improving a driver's manipulation feeling and convenience of shifting lever 3.

In addition, in order that the force required to move shifting lever 3 is gradually changed as shifting lever 3 moves apart from first section 9 when shifting lever 3 moves second section 11, a plurality of effort magnets 57 are provided in main shaft 1 to interact with first detent magnet 53 to gradually change a force required to move slide portion 19.

Therefore, when a driver moves shifting lever 3 within second section 11, the force required to move shifting lever 3 may be gradually increased or decreased as shifting lever 3 moves apart from first section 9. Hence, a driver can roughly guess an approximate position of shifting lever 3 with a hand manipulation feeling, without confirming it with driver's own eyes.

In the exemplary embodiment illustrated in FIG. 3, the size of effort magnet 57 increases as it is apart from first section 9, and thus, more force is required as shifting lever 3 is manipulated apart from first section 9.

For reference, due to the interaction between the plurality of effort magnets 57 and first detent magnet 53 as described above, shifting lever 3 is moved without being stopped between two arbitrary positions adjacent to each other within second section 11. Thus, shifting lever 3 may be moved not softly but intermittently.

That is, in various exemplary embodiments, the consecutive displacement of shifting lever 3 in second section 11 may be formed in a manner that shifting lever 3 can be consecutively moved to and stopped at an infinite position, and may also be formed while shifting lever 3 is moving to a plurality of positions sequentially spaced apart from one another.

On the other hand, the plurality of spaced positions are not selected while changing certain shift ranges as in the related art, but they are used to represent a series of values prepared for indicating a level at which a driver wants to control the shift range or other arbitrary control target mounted on a vehicle within the specific shift range.

For example, in a case in which the specific shift range is the D range, if the displacement within second section 11 of shifting lever 3 means a so-called eco mode in which a side close to first section 9 is made to select a shifting pattern based on the fuel efficiency of a vehicle, it may be controlled in a so-called sporty mode in which a shifting pattern is selected based on the driving force of a vehicle as shifting lever 3 is moved apart from first section 9 within second section 11. At the same time, as shifting lever 3 is moved from a side close to first section 9 to a side far from first section 9, it can be interworked and consecutively controlled so that a suspension of a vehicle is changed from a soft comfortable ride to a gradually hard comfortable ride.

Meanwhile, the above-described exemplary embodiments of the present invention can be expressed as follows. The exemplary shifting apparatuses may include a shifting lever 3, a gate plate 7, a guide unit, and a detection unit. Gate plate 7 can sequentially select a plurality of shift ranges according to the movement of shifting lever 3 along a single path that is not branched, and gate plate 7 includes a gate pattern 5 that is set to form a consecutive displacement of shifting lever 3 with respect to one specific shift range among the plurality of shift ranges. The guide unit guides shifting lever 3 to move along gate pattern 5 of gate plate 7. The detection unit detects the movement of shifting lever 3 along gate pattern 5.

Gate pattern 5 of gate plate 7 includes a first section 9 in which the other shift ranges except the specific shift range among the plurality of shift ranges are sequentially disposed at a predetermined distance from each other, a second section 11 which is disposed to deviate from first section 9 and forms the specific shift range, and a connection section 13 which is inclined to connect first and second sections 9 and 11.

In addition, the guide unit includes a slide portion 19 provided in shifting lever 3, and a main shaft 1 inserted into the inside of slide portion 19 to guide a straight sliding motion and a pivot motion of shifting lever 3.

Furthermore, the detection unit includes a sensing element 30, a plurality of position sensors 31, and a consecutive detection unit. Sensing element 30 is provided in slide portion 19. The plurality of position sensors 31 are provided to detect whether or not each of the shift ranges arranged in first section 9 is selected while shifting lever 3 is moved along first section 9, according to the position of sensing element 30. The consecutive detection unit is provided to consecutively detect the displacement of slide portion 19 when shilling lever 3 is moved in second section 11.

For convenience in explanation and accurate definition in the appended claims, the terms upper or lower, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting apparatus for a vehicle, comprising:
    a main shaft;
    a shifting lever installed to slide in a straight line and pivot along the main shaft; and
    a gate plate limiting a reciprocation path of the shifting lever such that the shifting lever reciprocates on a single path while sliding in a straight line and pivoting along the main shaft, the gate plate including a gate pattern having a plurality of shift ranges arranged in a line on the reciprocation path;
    wherein the gate pattern of the gate plate is formed in such a manner that a D range among the plurality of shift ranges is discriminated from other shift ranges in the plurality of shift ranges, and the D range is set in such a manner that the shifting lever forms consecutive displacements with respect to the gate plate; and
    the gate pattern of the gate plate includes:
        a first section formed as a straight portion, in which the other shift ranges except the D range among the plurality of shift ranges are sequentially disposed at a predetermined distance from each other;
        a second section formed as a straight portion, in which the D range is arranged, wherein the second section is disposed to deviate from the first section and is substantially parallel to the first section; and
        a connection section which is inclined to connect the first and second sections,
    a guide wing protruding from a side surface of a slide portion of the shifting lever, in order to pivot the shifting lever along the connection section when the shifting lever is moved from the first section to the second section through the connection section; and
    a pivot guide installed to come in contact with the guide wing, when the guide wing is moved in a straiht line along the main shaft, and pivot the slide portion on the main shaft;
    wherein the guide wing and the pivot guide include inclined surfaces, respectively, which are opposite to each other and come in surface contact with each other, and, while the inclined surface of the guide wing is moved along the inclined surface of the pivot guide, the shifting lever is moved along the connection section.

2. The shifting apparatus for a vehicle as defined in claim 1, wherein the D range is for the running of the vehicle.

3. The shifting apparatus for a vehicle as defined in claim 1, wherein the shifting lever comprises:
    a knob portion grasped and manipulated by a driver's hand;
    a lever portion extending to a lower side of the knob portion and passing through the gate plate;
    the slide portion provided under the lever portion and covering the main shaft so as to slide in a straight line and pivot along the main shaft; and
    a safety button provided to receive a driver's switching manipulation.

4. The shifting apparatus for a vehicle as defined in claim 3, further comprising:
    a sensing element provided in the slide portion; and
    a plurality of position sensors detecting whether or not each of the shift ranges arranged in the first section is selected while the shifting lever is moved along the first section, according to a position of the sensing element.

5. The shifting apparatus for a vehicle as defined in claim 4, wherein the sensing element includes a magnet, and the plurality of position sensors include a plurality of magnet approach sensors which are disposed in respective shift ranges to sense the approach of the magnet.

6. The shifting apparatus for a vehicle as defined in claim 3, further comprising a consecutive detection unit which consecutively detects displacements of the slide portion when the shifting lever is moved in the second section.

7. The shifting apparatus for a vehicle as defined in claim 6, wherein the consecutive detection unit comprises:
- a rack bar provided to move straight along the main shaft together with the slide portion when the shifting lever enters the second section;
- a rotating magnet geared with the rack bar and provided to rotate along the straight movement of the rack bar; and
- a magnet rotation sensor sensing the rotation of the rotating magnet.

8. The shifting apparatus for a vehicle as defined in claim 7, wherein the rack bar is integrally formed with an operation protrusion protruding toward the slide portion; and
- the slide portion is integrally formed with a rack bar operation groove into which the operation protrusion is inserted so that when the shifting lever is moving in the first section, the shifting lever does not interfere with the operation protrusion and, only when the shifting lever is moving in the second section, the operation protrusion and the slide portion are integrated together.

9. The shifting apparatus for a vehicle as defined in claim 3, further comprising: a shift lock protrusion formed to integrally protrude from a side of the slide portion in order to implement the shift lock function; and
- a plurality of shift lock actuators provided to block both sides of the shift lock protrusion, when the shifting lever is positioned in each shift range arranged in the first section, and switch a state limiting the movement of the shift lock protrusion along the longitudinal direction of the main shaft.

10. The shifting apparatus for a vehicle as defined in claim 9, wherein a P range forming a parking state is arranged at one of both ends of the first section, which is opposite to an end to which the connection section is connected, and an ignition switch controlling start-up of a vehicle engine is provided outside the P range of the first section.

11. The shifting apparatus for a vehicle as defined in claim 10, wherein the ignition switch comprises: a first ignition switch manipulated by a pressure that a user applies downward from an upper side of the gate plate;
- an ignition protrusion protruding from the lever portion of the shifting lever forwardly in the longitudinal direction of the main shaft;
- a second ignition switch manipulated by the ignition protrusion when the shifting lever is pushed forwardly in the longitudinal direction of the main shaft; and
- the shift lock actuators limiting the movement of the shift lock protrusion when the shifting lever is in the P range, and allowing the movement of the shift lock protrusion when the safety button is manipulated, whereby the ignition protrusion pressurizes the second ignition switch.

12. The shifting apparatus for a vehicle as defined in claim 3, further comprising:
- a first detent magnet provided at the inside of the slide portion in order to give a restrained manipulation feeling when the shifting lever selects each shift range of the first section; and
- a plurality of second detent magnets provided in the main shaft to interact with the first detent magnet to form a restrained manipulation feeling.

13. The shifting apparatus for a vehicle as defined in claim 12, further comprising a plurality of effort magnets provided in the main shaft to interact with the first detent magnet to gradually change a force required to move the slide portion, in order that the force required to move the shifting lever is gradually changed as the shifting lever moves apart from the first section while the shifting lever moves along the second section.

14. A shifting apparatus for a vehicle, comprising:
- a main shaft;
- a shifting lever;
- a gate plate sequentially selecting a plurality of shift ranges according to the movement of the shifting lever along a single path that is not branched, the gate plate including a gate pattern that is set to form a consecutive displacement of the shifting lever with respect to a specific shift range among the plurality of shift ranges;
- a guide unit guiding the shifting lever to move along the gate pattern of the gate plate; and
- a detection unit detecting the movement of the shifting lever along the gate pattern,
wherein the gate pattern of the gate plate includes:
- a first section in which other shift ranges among the plurality of shift ranges except the specific shift range are sequentially disposed at a predetermined distance from each other;
- a second section at which the specific shift range is arranged, wherein the second section is disposed to deviate from the first section and is substantially parallel to the first section and; and
- a connection section which is inclined to connect the first and second sections,
- a guide wing protruding from a side surface of a slide portion of the shifting lever, in order to pivot the shifting lever along the connection section when the shifting lever is moved from the first section to the second section through the connection section; and
- a pivot guide installed to come in contact with the guide wing, when the guide wing is moved in a straight line along the main shaft, and pivot the slide portion on the main shaft;
wherein the guide wing and the pivot guide include inclined surfaces, respectively, which are opposite to each other and come in surface contact with each other, and, while the inclined surface of the guide wing is moved along the inclined surface of the pivot guide, the shifting lever is moved along the connection section.

15. The shifting apparatus for a vehicle as defined in claim 14, wherein the guide unit comprises:
the slide portion provided in the shifting lever; and
the main shaft is inserted into the inside of the slide portion to guide a straight sliding motion and a pivot motion of the shifting lever.

16. The shifting apparatus for a vehicle as defined in claim 14, wherein the detection unit comprises:
- a sensing element provided in the slide portion;
- a plurality of position sensors provided to detect whether or not each of the shift ranges arranged in the first section is selected while the shifting lever is moved along the first section, according to a position of the sensing element; and
- a consecutive detection unit provided to consecutively detect the displacement of the slide portion when the shifting lever is moved in the second section.

* * * * *